(12) United States Patent
Abe

(10) Patent No.: US 8,442,413 B2
(45) Date of Patent: May 14, 2013

(54) BEARING SEAL UNIT, AND DEVELOPING DEVICE AND IMAGE FORMING DEVICE USING BEARING SEAL UNIT

(75) Inventor: Shinya Abe, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 311 days.

(21) Appl. No.: 12/857,796

(22) Filed: Aug. 17, 2010

(65) Prior Publication Data
US 2011/0194873 A1    Aug. 11, 2011

(30) Foreign Application Priority Data

Feb. 8, 2010    (JP) .................. 2010-025751

(51) Int. Cl.
G03G 15/08 (2006.01)
F16C 33/76 (2006.01)

(52) U.S. Cl.
USPC ........................... 399/103; 384/477

(58) Field of Classification Search ............ 399/102, 399/103, 106; 384/477, 484, 486, 607; 277/549, 277/572, 574, 576, 577
See application file for complete search history.

(56) References Cited

U.S. PATENT DOCUMENTS

| | | | | |
|---|---|---|---|---|
| 3,291,495 A | * | 12/1966 | Liebig | 277/577 |
| 4,415,166 A | * | 11/1983 | Beia | 277/551 |
| 5,541,710 A | * | 7/1996 | Stewart et al. | 399/98 |

FOREIGN PATENT DOCUMENTS

| | | |
|---|---|---|
| JP | A-03-189666 | 8/1991 |
| JP | A-2002-323139 | 11/2002 |
| JP | B2-4072589 | 4/2008 |
| JP | B2-4105370 | 6/2008 |

* cited by examiner

*Primary Examiner* — David Gray
*Assistant Examiner* — Gregory H Curran
(74) *Attorney, Agent, or Firm* — Oliff & Berridge, PLC

(57) ABSTRACT

A bearing seal unit comprises: a bearing member that supports a rotating shaft so as to freely rotate; a seal member provided integrally at one side along an axial direction of the bearing member to seal the rotating shaft; a connecting part extended along the axial direction from one member to the other member of the bearing member and the seal member and having an end side in the extending direction which protrudes more in the direction intersecting the axial direction than a base end side to connect the bearing member integrally with the seal member.

6 Claims, 14 Drawing Sheets

BEARING SEAL UNIT, AND DEVELOPING DEVICE AND IMAGE FORMING DEVICE USING BEARING SEAL UNIT

CROSS-REFERENCE TO RELATED APPLICATION

This application is based on and claims priority under 35 USC 119 from Japanese Patent Application No. 2010-025751 filed on Feb. 8, 2010.

BACKGROUND

Technical Field

The present invention relates to a bearing seal unit, and a developing device and an image forming device using the bearing seal unit.

SUMMARY

According to an aspect of the invention, a bearing seal unit comprises: a bearing member that supports a rotating shaft so as to freely rotate; a seal member provided integrally at one side along an axial direction of the bearing member to seal the rotating shaft; a connecting part extended along the axial direction from one member to the other member of the bearing member and the seal member and having an end side in the extending direction which protrudes more in the direction intersecting the axial direction than a base end side to connect the bearing member integrally with the seal member.

BRIEF DESCRIPTION OF THE DRAWINGS

Exemplary embodiments of the invention will be described in detail based on the following figures, wherein.

DETAILED DESCRIPTION

Figure 1A:
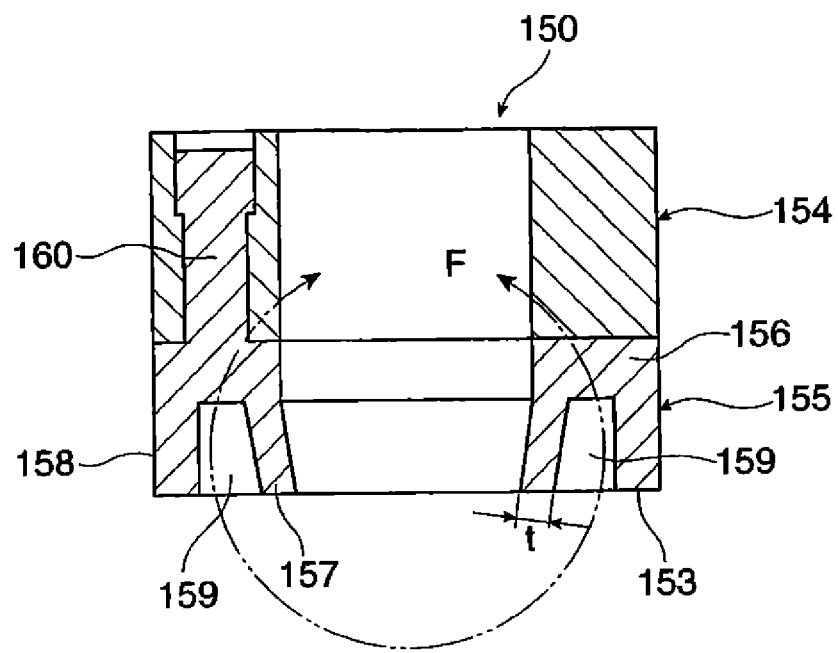
FIGS. 1A and 1B are a sectional structure view showing a bearing seal unit according to a first exemplary embodiment of the present invention.

Now, an exemplary embodiment of the present invention will be described below by referring to the drawings.

First Exemplary Embodiment

Figure 2:
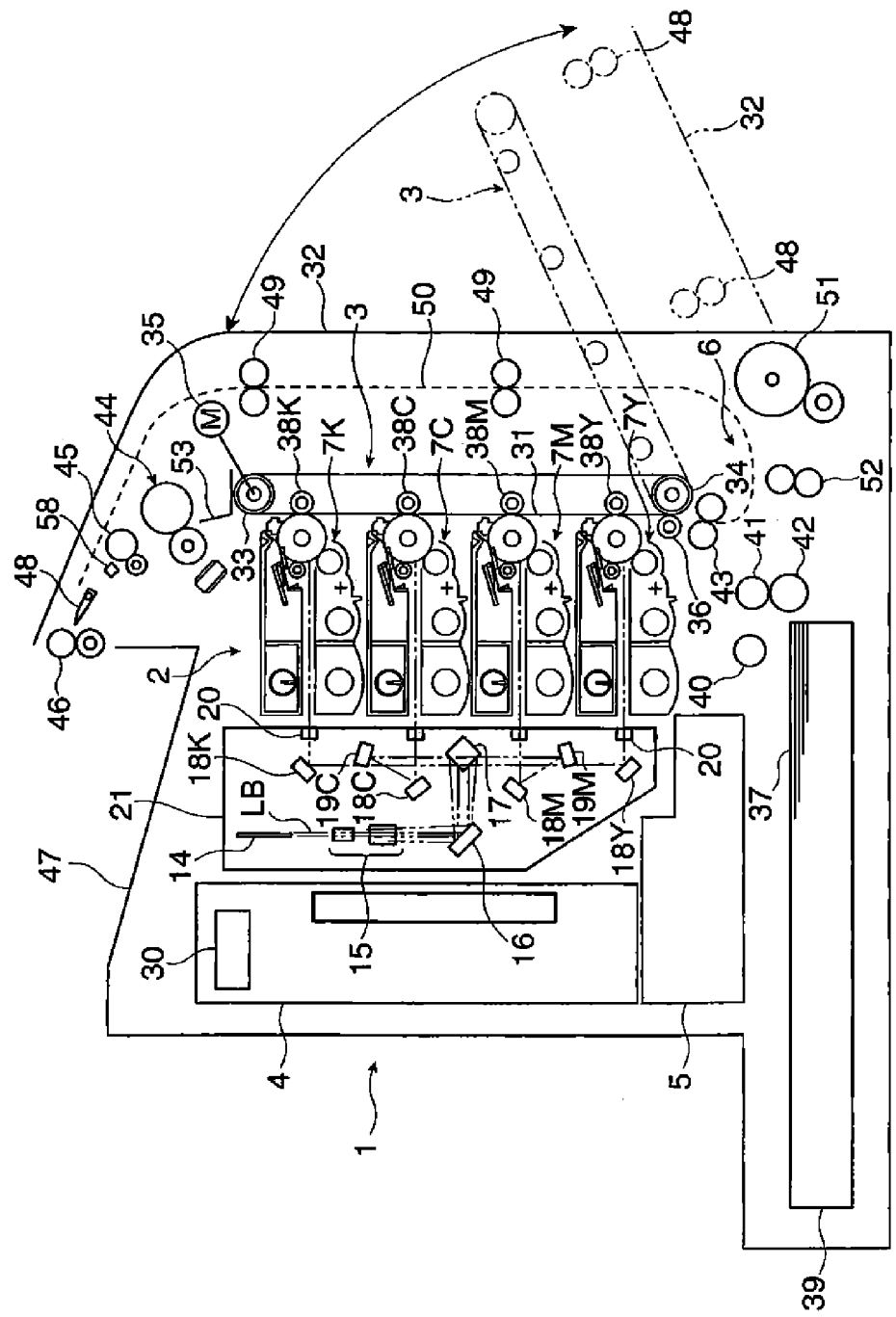
FIG. 2 is a structural view showing a tandem type digital color printer as an image forming device to which the bearing seal unit according to the first exemplary embodiment of the present invention is applied.

FIG. 2 shows a tandem type full color printer as an image forming device using a seal member also serving as a bearing according to a first exemplary embodiment of the present invention.

In FIG. 2, reference numeral 1 designates a main body of the tandem type full color printer as a main body of the image forming device. In a substantially central part in the full color printer main body 1, an image forming part 2 is arranged upward and downward along a vertical direction. Further, in the full color printer main body 1, in one side (a right side in an illustrated example) of the image forming part 2, a sheet conveying belt unit 3 is arranged which attracts and conveys a transfer material to which toner images of plural of colors formed in the image forming part 2. In the other side (a left side in the illustrated example) of the image forming part 2, a control unit 4 having a control circuit is provided, and, in an obliquely downward part of the image forming part 2, a power circuit unit 5 having a high voltage power circuit is provided respectively. Further, in a bottom part in the full color printer main body 1, a sheet feeding device 39 is provided for feeding a transfer sheet 37 as a transfer material.

The above-described image forming part 2 includes, in order from a lower part, four image forming units 7Y, 7M, 7C and 7K for forming the toner images of colors of yellow (Y), magenta (M), cyan (C) and black (K) respectively. The four image forming units 7Y, 7M, 7C and 7K are arranged in parallel at prescribed intervals along the vertical direction.

Figure 3:
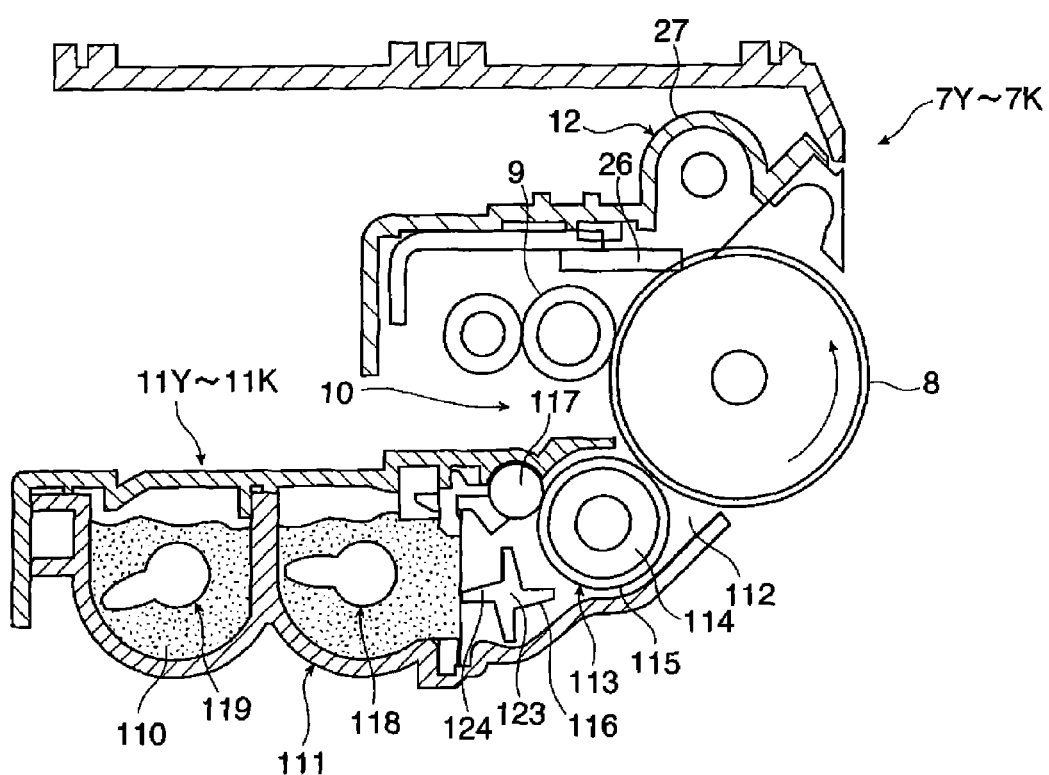
FIG. 3 is a structural view showing an image forming part of the tandem type digital color printer as the image forming device to which the bearing seal unit according to the first exemplary embodiment of the present invention is applied.

The four image forming units 7Y, 7M, 7C and 7K are all similarly formed except the colors of images formed thereby. Roughly classified as shown in FIG. 3, the image forming unit includes a photosensitive drum 8 as an image carrier that is rotated and driven at a prescribed speed along a direction shown by an arrow mark, a charging roll 9 for a primary charging for uniformly charging a surface of the photosensitive drum 8, a passage 10 for exposing an image that applies an image exposure corresponding to each color to the surface of the photosensitive drum 8 by a below-described image exposure device 21 to form an electrostatic latent image, a developing device 11 as developing means for developing the electrostatic latent image formed on the photosensitive drum 8 by the toner of a corresponding color and a cleaning device 12 for cleaning the transferred toner remaining on the photosensitive drum 8.

As a developer, what is called a two-component developer including toner and a carrier or what is called a one-component developer including only toner may be used. In this exemplary embodiment, what is called a two-component developer including the toner and the carrier is used.

As shown in FIG. 2, the above-described image exposure device 21 is commonly formed for the four image forming units 7Y, 7M, 7C and 7K of yellow (Y), magenta (M), cyan (C) and black (K), and includes four semiconductor lasers 14 for outputting laser beams LB in accordance with image data of the colors of yellow (Y), magenta (M), cyan (C) and black (K) respectively, a collimator lens 15 for making the four laser beams LB respectively outputted from the four semiconductor lasers 14 parallel, a reflecting mirror 16 for reflecting the laser beams LB outputted from the semiconductor lasers 14, a rotating polygon mirror 17 for deflecting and scanning the laser beams LB reflected on the reflecting mirror 16, plural of reflecting mirrors 18 and 19 for scanning and exposing the laser beams LB reflected on the rotating polygon mirror 17 on the photosensitive drums 8 of the image forming units 7Y, 7M, 7C and 7K respectively and a transmitting glass 20 that transmits the laser beams LB. The reflecting mirrors 18 and 19 have functions for changing focal distances (f) in accordance with the deflection angles (θ) of the laser beams LB.

Figure 4:
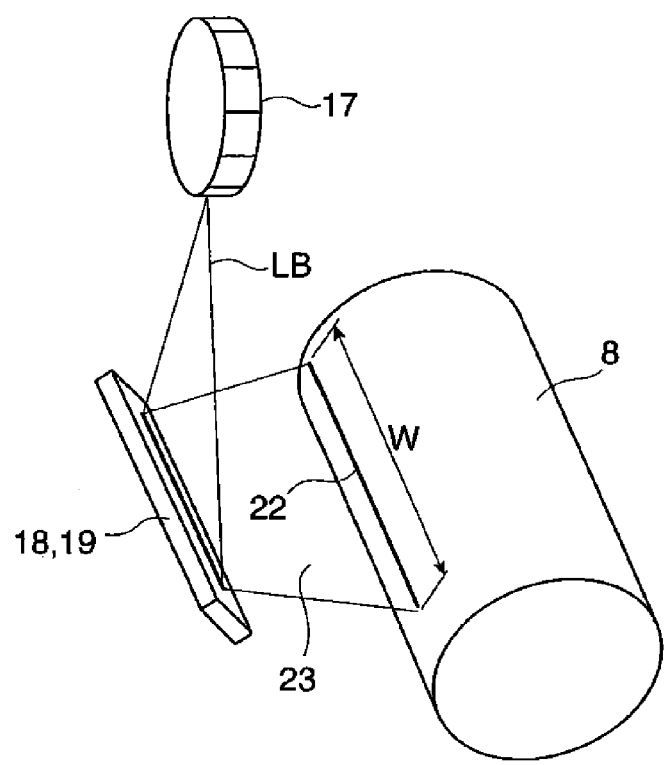
FIG. 4 is a perspective structural view showing an image exposure part of the tandem type digital color printer as the image forming device to which the bearing seal unit according to the first exemplary embodiment of the present invention is applied.

Further, in the laser beams LB scanning and exposed on the photosensitive drums 8 by the image exposure device 21, as shown in FIG. 2, the laser beams LB outputted from the semiconductor lasers 14 are applied on the surfaces of the rotating polygon mirror 17 in the forms of spots through the collimator lens 15 and respectively reflected on the surfaces of the rotating polygon mirror 17 rotated and driven at high speed so that the laser beams LB scan and are exposed on the surfaces of the photosensitive drums 8. Accordingly, as shown in FIG. 4, the laser beams LB are reflected respectively on the surfaces of the rotating polygon mirror 17 rotated and driven at high speed, so that the laser beams scan and are exposed on the surfaces of the photosensitive drums 8 substantially in the forms of fans.

Further, the above-described developing device 11 includes, as shown in FIG. 3, developing device main bodies 111 in which a developer 110 is accommodated. In one end part of each of the developing device main bodies 111, an opening part 112 is provided at a position opposed to the photosensitive drum 8. In the opening part 112 of the developing device main body 111, a developing roll 113 as a developer carrier is arranged. The developing roll 113 includes a magnet roll 114 attached in a fixed state to an inner part and a developing sleeve 115 attached to an outer periphery of the magnet roll 114 so as to freely rotate.

Further, in the developing device main body 111, a supply paddle 116 for supplying the developer 110 to the developing roll 113 is arrange obliquely downward the developing roll 113 so as to freely rotate. In the developing device main body 111, a layer thickness regulating member 117 for regulating the thickness of the layer of the developer 110 supplied to the surface of the developing roll 113 is arranged in a fixed state at a position nearer to the opening part 112 than a position of the supply paddle 116.

Figure 5:
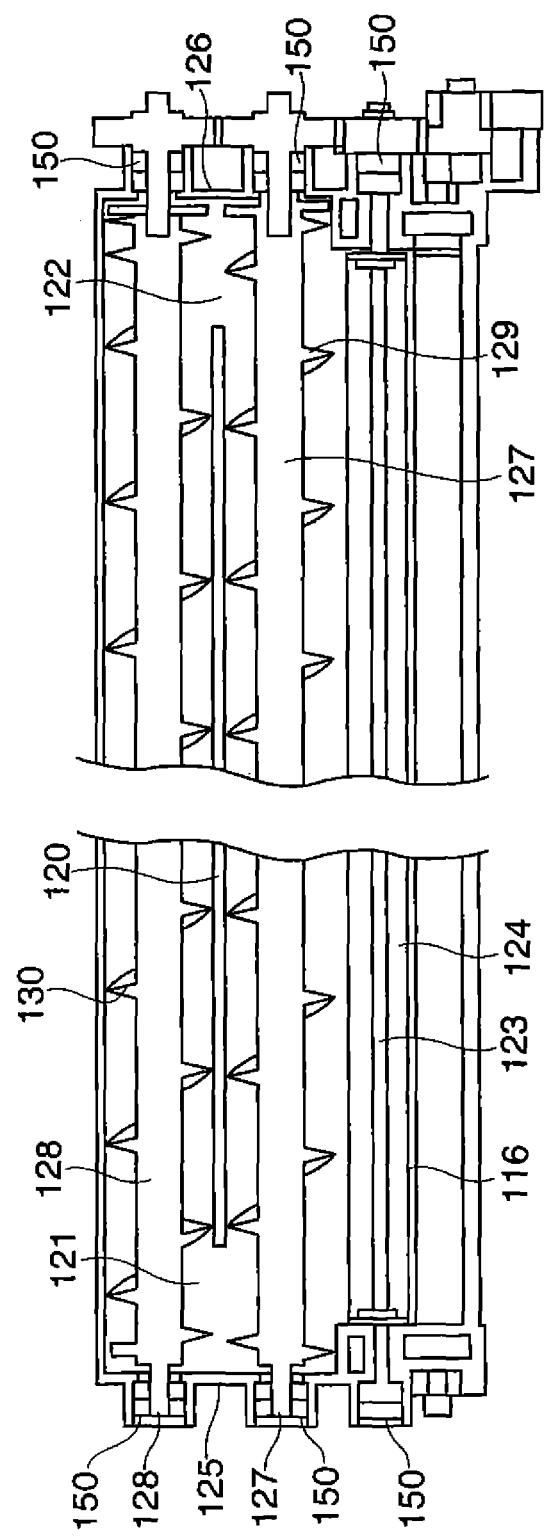
FIG. 5 is a sectional structure view showing a developing device of the tandem type digital color printer as the image forming device to which the bearing seal unit according to the first exemplary embodiment of the present invention is applied.

Further, in a rear side of the supply puddle 116 of the developing device main body 111, agitating and conveying augers 118 and 119 as first and second agitating and conveying members are provided so as to freely rotate which agitate the developer 110 accommodated in the developing device main body 111 in mutually opposite directions vertical to the drawing and supply the developer to the supply paddle 116. The first and second agitating and conveying augers 118 and 119 are partitioned by a partition wall 120 as shown in FIG. 5. At both ends along the longitudinal direction of the partition wall 120, passages 121 and 122 are provided for delivering the developer 110 between the first and second agitating and conveying augers 118 and 119.

As shown in FIGS. 3 and 5, as the supply puddle 116, a puddle is used which is formed in such a way that four plate shaped paddle members 124 are directed outward in the radial direction and attached to an outer periphery of a rotating shaft 123 so as to form angles of, for instance, 90° between them along the circumferential direction. In the supply paddle 116, protruding end parts at both end parts along the axial direction of the rotating shaft 123 are attached to both side walls 125 and 126 of the developing device main body 111 so as to freely rotate.

Further, as shown in FIG. 5, as the first and second agitating and conveying augers 118 and 119, members are used which are formed in such a way that agitating and conveying vanes 129 and 130 are spirally provided at predetermined pitches on the outer peripheries of rotating shafts 127 and 128. Also in the first and second agitating and conveying augers 118 and 119, protruding end parts at both end parts along the axial directions of the rotating shafts 127 and 128 are attached to both the side walls 125 and 126 of the developing device main body 111.

In the developing device 11, as shown in FIG. 3, the thickness of the layer of the developer 110 agitated and conveyed by the first and second agitating and conveying augers 118 and 119 so as to be circulated and supplied from the first agitating and conveying auger 118 to the developing roll 113 by the supply paddle 116 is regulated to a prescribed value by the layer thickness regulating member 117, and the developer is conveyed to a developing area opposed to the photosensitive drum 8 to develop the electrostatic latent image formed on the surface of the photosensitive drum 8 by the toner of a prescribed color.

Further, the above-described cleaning device 12 removes, as shown in FIG. 3, the transferred toner remaining on the surface of the photosensitive drum 8 is removed by a cleaning blade 26. The removed residual transferred toner is collected and accommodated to an inner part 27 of the cleaning device 12.

On the other hand, in the full color printer main body 1, the control unit 4 is arranged as shown in FIG. 2. In the control unit 4, for instance, an image processor 30 is provided for applying a prescribed image process to the image data. From the image processor 30, the image data of the colors including yellow (Y), magenta (M), cyan (C) and black (K) is respectively sequentially outputted to the image exposure device 21. The four laser beams LB outputted from the image exposure device 21 in accordance with the image data respectively scan and are exposed on the surfaces of the photosensitive drums 8Y, 8M, 8C and 8K to form the electrostatic latent images. The electrostatic latent images respectively formed on the photosensitive drums 8Y, 8M, 8C and 8K are developed by the developing devices 11Y, 11M, 11C and 11K as toner images of the colors including yellow (Y), magenta (M), cyan (C) and black (K) respectively.

Further, the above-described sheet conveying belt unit 3 includes, as shown in FIG. 2, a sheet conveying belt 31 circulated and moved without breaks as an endless belt. The sheet conveying belt 31 is adapted to convey the transfer sheet 37 as the transfer material to which the toner images of the colors including yellow (Y), magenta (M), cyan (C) and black (B) respectively formed by the image forming units 7Y, 7M, 7C and 7K are transferred under a state that the transfer sheet 37 is electro-statically attracted. Further, the sheet conveying belt unit 3 is integrally formed with conveying rolls 49 provided in a below-described reversing sheet conveying passage 50 as a unit. When the sheet conveying belt unit 3 is jammed with the transfer sheets 37, as shown by a broken line in FIG. 2, a front cover 32 of the printer main body 1 is opened so that the sheet conveying unit may be moved to a retreat position rotated clockwise relative to the printer main body 1.

The above-described sheet conveying belt 31 is extended with a prescribed tension between a driving roll 33 and a driven roll 34 as tension rolls arranged along a vertical direction as shown in FIG. 2 and circulated and moved at a prescribed speed along a clockwise direction by the driving roll 33 rotated and driven by, for instance, a driving motor 35 through gears not shown in the drawing. A distance between the driving roll 33 and the driven roll 34 is set to, for instance, a length substantially equal to the length of the transfer sheet 37 of a size A3. However, the distance between the driving roll and the driven roll is not limited thereto. It is to be understood that the distance between the driving roll 33 and the driven toll 34 may be arbitrarily set. As the sheet conveying belt 31, for instance, an endless belt shaped member is used which is formed with a synthetic resin film such as polyimide having a flexibility.

Further, on the surface of the driven roll 34, as shown on FIG. 2, an attracting roll 36 for electro-statically attracting the transfer sheet 37 to the surface of the sheet conveying belt 31 is arranged so as to abut thereon through the sheet conveying belt 31. The attracting roll 36 is formed by coating a surface of a metal core bar with electrically conductive rubber, like, for instance, the charging rolls 9 of the image forming units 7Y, 7M, 7C and 7K and a prescribed bias voltage for attracting is applied to the metal core bar. Then, the attracting roll 36 electro-statically charges the transfer sheet 37 fed from the sheet feeding device 6 to attract the transfer sheet to the surface of the sheet conveying belt 31.

The toner images of the colors including yellow (Y), magenta (M), cyan (C) and black (K) respectively formed on the photosensitive drums 8Y, 8M, 8C and 8K of the image forming units 7Y, 7M, 7C and 7K are mutually overlapped on and multi-transferred to the transfer sheet 37 conveyed under a state that the transfer sheet is attracted to the surface of the sheet conveying belt 31 by transfer rolls 38Y, 38M, 38C and 38K as shown in FIG. 2. The transfer rolls 38Y, 38M, 38C and 38K are attached integrally to a side of the sheet conveying belt unit 3 as shown in FIG. 2.

The transfer sheet 37 is fed from the sheet feeding device 6 arranged in the bottom part of the printer main body 1. The sheet feeding device 6 includes a sheet tray 39 in which the transfer sheets 37 having desired sizes or materials are accommodated. From the sheet tray 39, the transfer sheets 37 of the desired sizes or materials are fed by a feeding roll 40 and fed under a state that the transfer sheets are separated one sheet by one sheet by a supply roll 41 and a loosening roll 42 and conveyed to an attracting position on the sheet conveying belt 31 at a prescribed timing through a resist roll 43 as sheet feeding means.

As the transfer sheet 37, sheet type members are used that have various sizes, for instance, the size of A4, the size of A3, or the size of B5 or the size of B4 and various kinds of materials such as an ordinary sheet, a thick sheet such as a coat sheet or an OHP sheet.

The transfer sheet 37 to which the toner images of the colors respectively including yellow (Y), magenta (M), cyan (C) and black (K) are multiply transferred, as shown in FIG. 2, is separated from the sheet conveying belt 31 due to a rigidity (what is called, a firmness) of the transfer sheet 37 itself, and then, conveyed to a fixing device 44 through a guide member 53 to fix the toner images of the colors respectively on the transfer sheet 37 under heat and pressure by the fixing device 44. The sheet conveying belt 31 and the fixing device 44 are arranged closely to each other. The transfer sheet 37 separated from the sheet conveying belt 31 is conveyed to the fixing device 44 by a conveying force of the sheet conveying belt 31. After that, the transfer sheet 37 to which the toner images of the colors are respectively fixed is discharged to a delivery tray 47 provided in an upper part of the full color printer main body 1 by a discharge roll 46 through an outlet roll 45 of the fixing device 44 under a state that a print surface is directed downward. Thus, a printing operation is finished.

In the full color printer, not only an image of full color, but also an image of a desired color such as a monochrome may be printed. In accordance with the color of the image to be printed, the toner images are formed by the image forming units 7Y, 7M, 7C and 7B of all or a part of yellow (Y), magenta (M), cyan (C) and black (K).

Further, when the images are formed on both the surfaces of the transfer sheet 37 by the full color printer, the transfer sheet 37 on one surface of which the image is fixed by the fixing device 44 is not directly discharged to the delivery tray 47. Under a state that a rear end of the transfer sheet 37 is held by the discharge roll 46, the discharge roll 46 is temporarily stopped and reversed and a conveying passage of the transfer sheet 37 is switched to an upper part by a switch gate 48 to convey the transfer sheet to the reversing sheet conveying passage 50 having the conveying rolls 49 provided along one side surface of the printer main body 1. Then, the transfer sheet 37 conveyed to the reversing sheet conveying passage 50 is conveyed again to the attracting position of the sheet conveying belt 31 by the resist roll 43 under a front surface and a back surface of the transfer sheet are reversed to each other. After the toner images are transferred to the back surface of the transfer sheet, a fixing process is applied thereto under heat and pressure by the fixing device 44. Then, the transfer sheet is discharged to the delivery tray 47 provided in the upper part of the printer main body 1 by the discharge roll 46.

In FIG. 2, reference numeral 51 designates a sheet feeding roll for feeding the transfer material of a desired size and quality from a manual insert tray (not shown in the drawing) provided in a side surface of the printer main body 1, and 52 designates a conveying roll for conveying the transfer material fed by the sheet feeding roll 51 to the resist roll 43 respectively.

Figure 6:
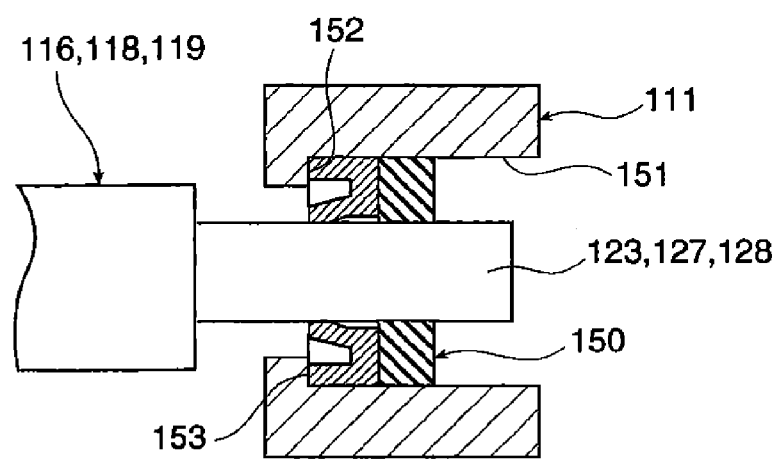
FIG. 6 is a sectional structure view showing a bearing part of the developing device.

In the developing device main body 111 of the developing device 11 according to the present exemplary embodiment, as shown in FIGS. 5 and 6, at positions corresponding to both end parts of the rotating shaft 123 of the supply paddle 116 and the rotating shafts 127 and 128 of the first and second agitating and conveying augers 118 and 119, attaching holes 151 are respectively provided for supporting the rotating shaft 123 of the supply paddle 116 and the rotating shafts 127 and 128 of the first and second agitating and conveying augers 118 and 119 so as to freely rotate and attaching the bearing seal units 150 having functions of seal members for preventing the leakage of the developer 110. The attaching holes 151 are configured in cylindrical forms having predetermined inside diameters. In an end part 152 in an inner side of the developing device main body 111, the inside diameter of the attaching hole 151 is set to be small so that an end face 153 of the bearing seal unit 150 abuts thereon.

The bearing seal units 150 that support the rotating shaft 123 of the supply paddle 116 and the rotating shafts 127 and 128 of the first and second agitating and conveying augers 118 and 119 are basically formed in the same manner except that the inside diameters of the bearing seal units 150 are respectively set to the inside diameters corresponding to the outside diameters of the rotating shafts 123, 127 and 178.

Figure 1B:
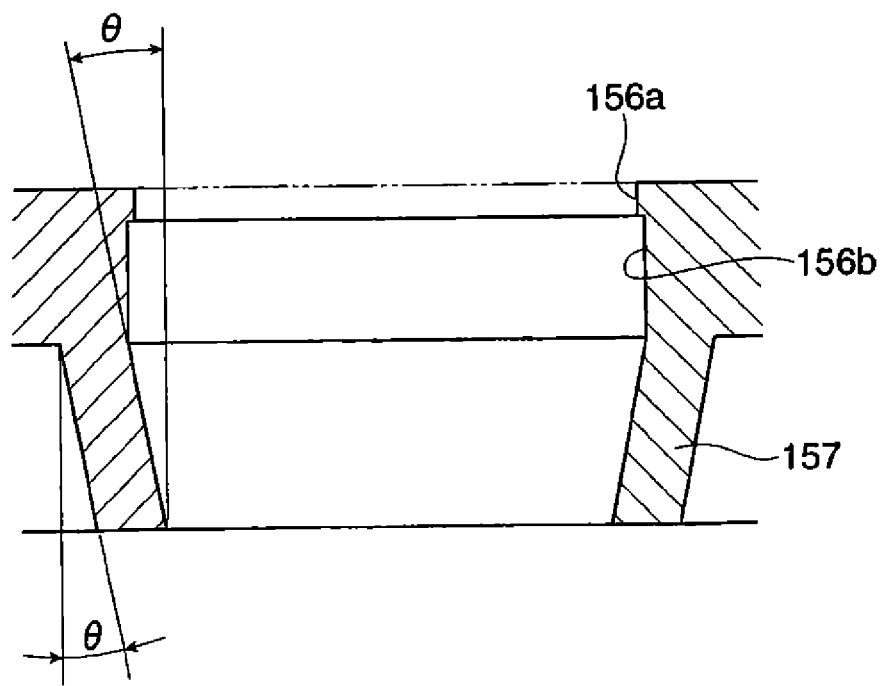

As shown in FIGS. 1A and 1B, the bearing seal unit 150 includes a bearing member 154 for supporting the rotating shaft 123, 127 or 128 so as to freely rotate and a seal member 155 provided integrally with one side along the axial direction of the bearing member 154 to seal the rotating shaft 123, 127 or 128.

The bearing member 154 is configured in a cylindrical form having an inside diameter predetermined correspondingly to the outside diameter of the rotating shaft 123, 127 or 128 and an outside diameter predetermined correspondingly to the inside diameter of the attaching hole 151. The bearing member 154 is formed in an extremely small shape having, for instance, the outside diameter set to about 8 mm and the inside diameter set to about 4 mm. However, a dimensional form of the bearing member 154 is not limited to the above-described values, and may be set to values larger or smaller than the above-described values. The bearing member 154 is formed by injection molding a synthetic resin having good sliding characteristics such as PA, PC, POM, PET, PBT, PPE, PPS, ABS PS, PP, etc.

Further, the seal member 155 is provided integrally in one end side along the axial direction of the bearing member 154, namely, in the inner side of the developing device main body 111. The seal member 155 includes a cylindrical part 156 configured in a cylindrical form having a predetermined length along the axial direction of the rotating shaft 123, 127 or 128, a lip part 157 provided in one end side (the inner side) in the axial direction of the cylindrical part 156 and protruding in an obliquely inclined state in an inner peripheral edge and an outer periphery cylindrical part 158 provided in one end side (the inner side) in the axial direction of the cylindrical part 156 and protruding with an outside diameter equal to that of the cylindrical part 156 in an outer peripheral end. The end face 153 located in one end side (the inner side) in the axial direction of the lip part 157 and the outer periphery cylindrical part 158 is configured so as to form the same plane intersecting substantially vertically to the axial direction.

In the inside diameter of the cylindrical part 156, only an end part 156a of the bearing member 154 side is set to be equal to or slightly smaller than the outside diameter of the rotating shaft 123, 127 or 128 over a predetermined minute length. The inside diameter of other part 156b of the cylindrical part 156 is set to a value slightly larger than the outside diameter of the rotating shaft 123, 127 or 128 in order to reduce a sliding resistance.

The lip part 157 has a predetermined thickness t and provided in an inwardly inclined state by a predetermined angle θ (for instance, about 9°) in the radial direction. Further, between the outer periphery of the lip part 157 and the inner periphery of the outer periphery cylindrical part 158, a space 159 is provided which is opened outward in the axial direction so that the lip part 157 may be elastically deformed outward in the radial direction.

As a material of the seal member 155, when a material of the bearing seal unit 150 is considered, thermoplastic elastomer is desirably used. The seal member 155 is usually formed with a thermosetting rubber material such as nitrile rubber. However, when the bearing seal unit 150 is produced by a process such as an injection molding process as described below, the elastomer (a polymer elastic material) having a thermo-plasticity is suitable that is molten and softened by heating.

As a material that forms the bearing member 154, the various kinds of synthetic resins may be used as described above. When the good sliding characteristics (low sliding characteristics) as the bearing member are considered, the POM is desirably used.

According to the adhesive property of the bearing member 154 and the seal member 155 forming the bearing seal unit 150 that is examined by the inventor of the invention, it is known that the POM as the material forming the bearing member 154 is not bonded (stuck) to the thermoplastic elastomer as the seal member 155.

Thus, when the POM having the good sliding characteristics (the low sliding characteristic) is selected as the material forming the bearing member 154 and the thermoplastic elastomer is selected as the seal member 155, even if the bearing member 154 is firmly formed integrally with the seal member 155 to combine these materials together for forming the bearing seal unit 150 and a load along the axial direction or the radial direction is applied in a complicated form, a preferable bearing performance needs to be compatible with a sealing performance.

The reason thereof is described below. When the bearing member 154 and the seal member 155 are separated or spaced from each other during their use, since the inclination of the rotating shaft 123, 127 or 128 is not zero, as a separated or spaced distance is larger, a bias in a contact pressure (sealing characteristics) between the lip part and the rotating shaft is more increased, which is liable to cause the developer 110 to leak due to a defective seal of the seal member 155. Further, when the bearing member and the seal member are separated or spaced from each other, the bearing is liable to be inclined so that the life of the bearing member 154 is caused to be lowered due to the increase of a bearing resistance.

The bearing seal unit according to the present exemplary embodiment includes a connecting part that is extended from one member of the bearing member and the seal member toward the other member along the axial direction with an end side of the extending direction more protruding in the direction intersecting the axial direction than a base end side to connect the bearing member integrally to the seal member.

Namely, as shown in FIGS. 1A and 7, in the seal member 155 of the bearing seal unit 150, on an end face of the cylindrical part 156 in the bearing member 154 side, three cylindrical parts 161 which form a part of the connecting parts 160 extended from the seal member 155 to the bearing member 154 in cylindrical forms along the axial direction are provided to protrude along the axial direction so as to form angles of 120° between them along the circumferential direction. Further, at ends of the three cylindrical parts 161, large diameter parts 162 are provided as one part of the connecting parts with the end sides in the extending direction more protruding in the direction intersecting the axial direction than the base end sides. As shown in FIG. 7D, the large diameter part 162 is formed in a cylindrical form whose diameter is larger than that of, for instance, the cylindrical part 161. The large diameter part 162 as a part in the end side in the extending direction forms the connecting part 160 more protruding in the direction intersecting the axial direction than the cylindrical part 161 as a part of the base end side. The number of the connecting parts 160 is not limited to three and may be one or two, or four or more.

As compared therewith, in the bearing member 154, three recessed parts 163 into which the three connecting parts 160 are inserted and arranged are provided. The forms of the three recessed parts 163 are set to forms corresponding to the connecting parts 160. However, a second recessed part 165 into which the large diameter part 162 of the connecting part 160 is inserted is formed to be larger than the large diameter part 162 so as to pass through to a surface in an opposite side Further, as shown in FIG. 1A, the connecting part 160 including the cylindrical part 161 and the large diameter part 162 is provided in the bearing member 154 as described above. As describe above, the bearing member 154 has, for instance, the outside diameter set to about 8 mm and the inside diameter set to about 4 mm. The connecting part 160 including the cylindrical part 161 and the large diameter part 162 needs to be formed in the bearing member 154 having the thickness of about 2 mm.

When a difference in diameter between the cylindrical part 161 and the large diameter part 162 is set to a large value to some degree to improve a connecting effect owing to a slip-out preventing effect of the large diameter part 162, the outside diameter of the cylindrical part 161 is relatively 1 mm or smaller. Thus, there is a fear that the cylindrical part 161 is liable to be broken by tension or the cylindrical part 161 itself is hardly formed.

Figure 7A:
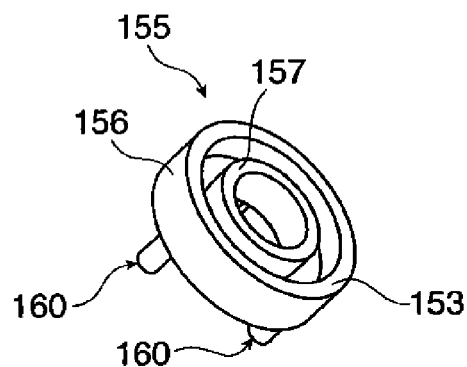
FIGS. 7A to 7E are a perspective structural view showing the bearing seal unit according to the first exemplary embodiment of the present invention.
Figure 7B:
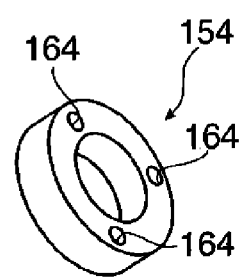
Figure 7C:
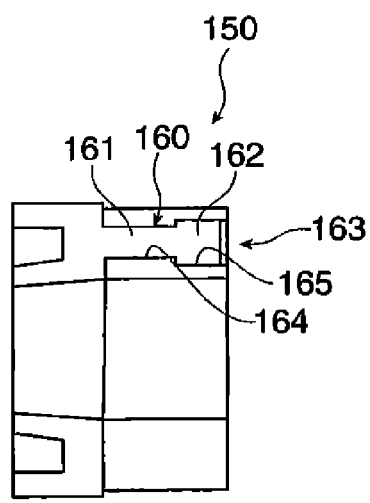
Figure 7D:
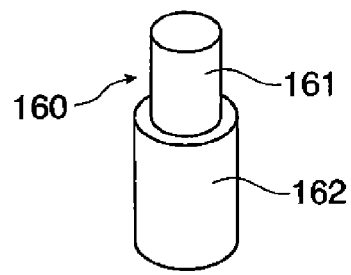
Figure 7E:
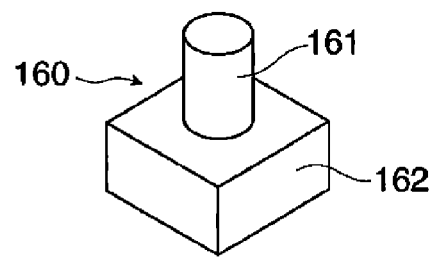

Thus, the large diameter part 162 forming the connecting part 160 is, as shown in FIG. 7E, preferably configured substantially in a rectangular or sector form so that not a length along an inward or outward direction in the radial direction, but a length along the circumferential direction of, not the radial direction of the bearing member 154, but the direction intersecting the axial direction is larger than that of the cylindrical part 161 as the base end side. Thus, a stepped part (an area) between the cylindrical part 161 and the large diameter part 162 may be enlarged without excessively reducing the diameter of the cylindrical part 161 to enhance the connecting effect due to the slip-out preventing effect.

The bearing seal unit 150 constructed as described above is produced, for instance, in such a way as described below.

Figure 8A:
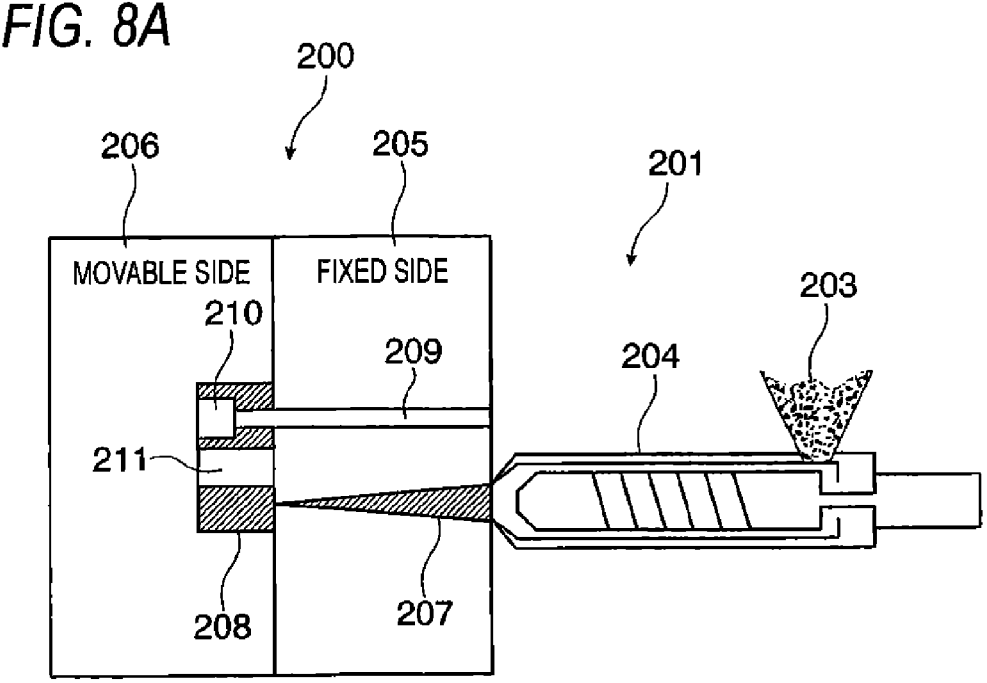
FIGS. 8A and 8B are a sectional structure view showing a producing device of the bearing seal unit according to the first exemplary embodiment of the present invention.
Figure 8B:
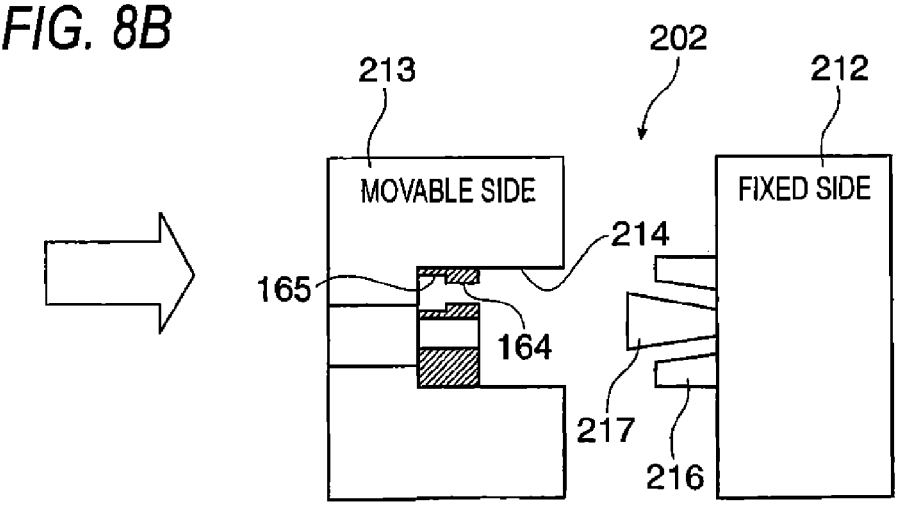
Figure 9:
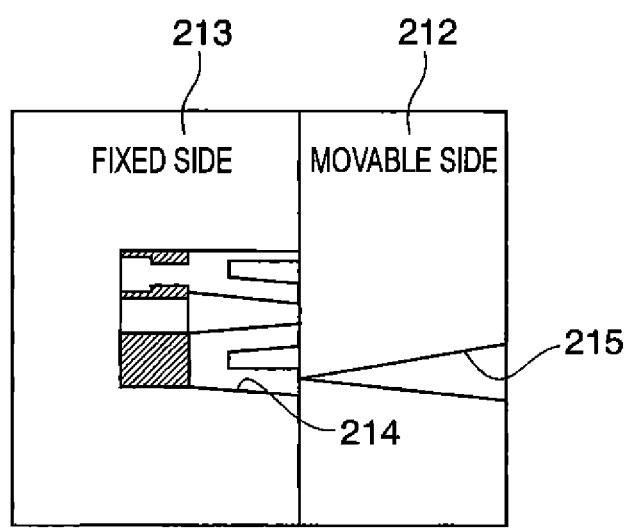
FIG. 9 is a sectional structure view showing the producing device of the bearing seal unit according to the first exemplary embodiment of the present invention.

FIGS. 8 and 9 show a manufacturing device made of a manufacturing metal mold for manufacturing the bearing seal unit 150.

The manufacturing device 200 includes, roughly classified as shown in FIGS. 8A and 8B, a first manufacturing metal mold 201 for forming the bearing member 154 and a second manufacturing metal mold 202 for forming the seal member 155 integrally with the bearing member 154 under a state that the bearing member 154 formed by the first manufacturing metal mold 201 is attached.

The above-described first manufacturing metal mold 201 includes, as shown in FIG. 8A, a melting and pressurizing device 204 that supplies a raw material 203 of a synthetic resin for forming the bearing member 154, heats and melts the raw material 203 of the synthetic resin and pressurize the raw material to press in the raw material to a cavity of the metal mold, a metal mold 205 of a fixed side for forming the bearing member 154 and a metal mold 206 of a movable side in which the cavity for forming the bearing member is formed. The raw material 203 of the synthetic resin molten and pressurized by the melting and pressurizing device 204 is injected to the cavity 208 in the metal mold 206 of the movable side through a press-in passage 207 provided in the metal mold 205 of the fixed side to form the bearing member 154. Further, in the metal mold 205 of the fixed side and the metal mold 206 of the movable side, cores 209 to 211 for forming the connecting part 160 are provided integrally or so as to be separable.

Then, the bearing member 154 as shown in FIG. 713 is formed by the first manufacturing metal mold 201.

Subsequently, the bearing member 154 is taken out from the first manufacturing metal mold 201 and set in the second manufacturing metal mold 202 as shown in FIG. 8B. The second manufacturing metal mold 202 includes a metal mold 212 of a fixed side for forming the seal member 155 integrally with the bearing member 154 and a metal mold 213 of a movable side in which the bearing member 154 is set and a cavity for forming the seal member 155 is formed.

As described above, the bearing member 154 formed by the first manufacturing metal mold 201 is set in a predetermined position of the cavity 214 provided in the metal mold 213 of the movable side. As shown in FIG. 9, the metal mold 213 of the movable side is moved and fixed to the metal mold 212 of the fixed side. The thermoplastic elastomer that is heated and molten is injected to the cavity 214 in the metal mold 213 of the movable side through a press-in passage 215 provided in the metal mold 212 of the fixed side so that the seal member 155 is formed integrally with the bearing member 154. Further, in the metal mold 212 of the fixed side and the metal mold 213 of the movable side, a core 216 or 217 for forming the lip part 157 of the seal member 155 is provided integrally or so as to be separable. The connecting part 160 is formed integrally by recessed parts 164 and 165 previously formed in the bearing member 154.

In the above-described manufacturing device, after the bearing member 154 is previously formed, the bearing member 154 needs to be temporarily taken out from the metal mold and set in the metal mold of the second manufacturing device. Further, in fitting for setting the bearing member 154 in the metal mold, since such a gap is merely provided as not to generate burs, it is not necessarily proper to automate the manufacturing device. Further, when the bearing member is manually inserted, a quality is hardly stabilized.

Figure 10A:
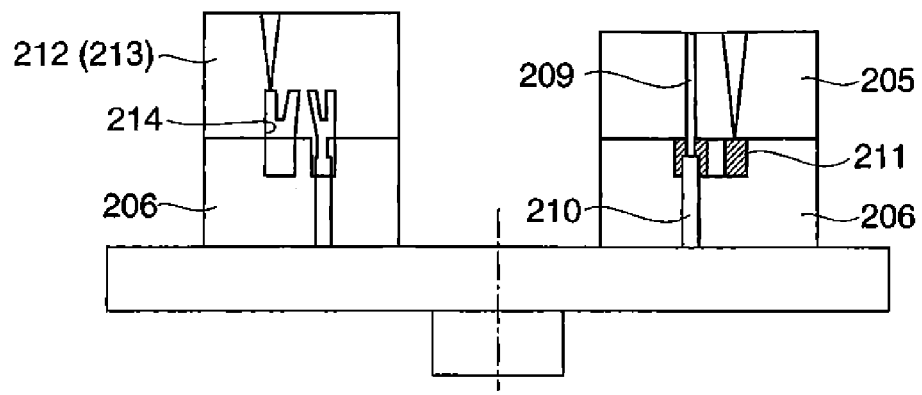
FIGS. 10A to 10E are a sectional structure view showing the producing device of the bearing seal unit according to the first exemplary embodiment of the present invention.
Figure 10B:
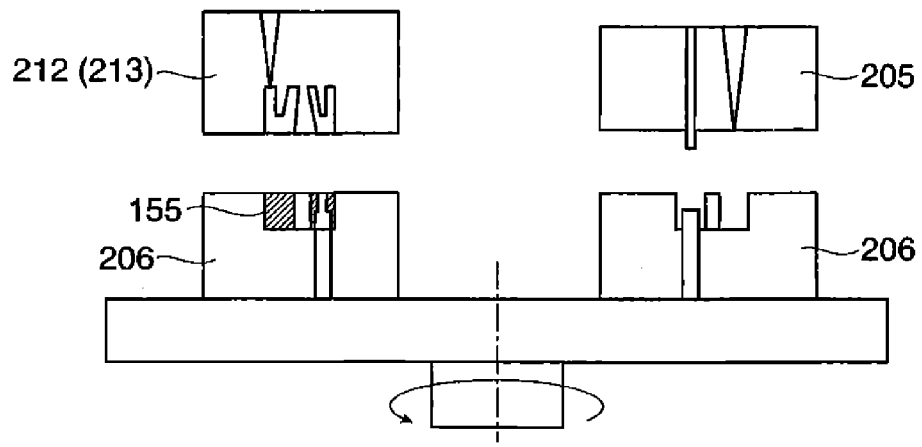
Figure 10C:
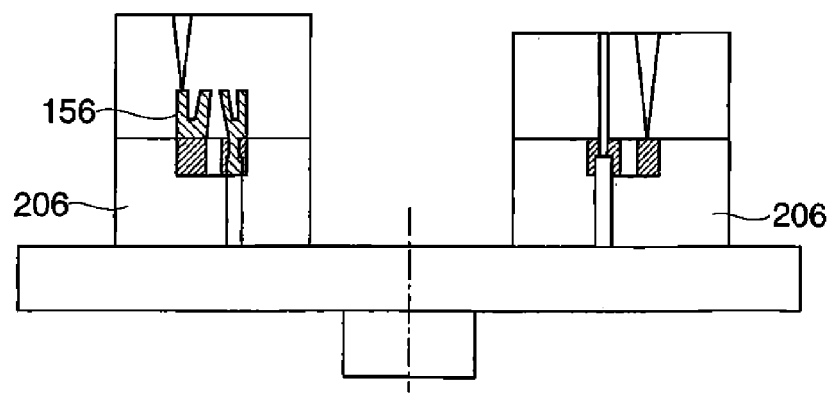
Figure 10D:
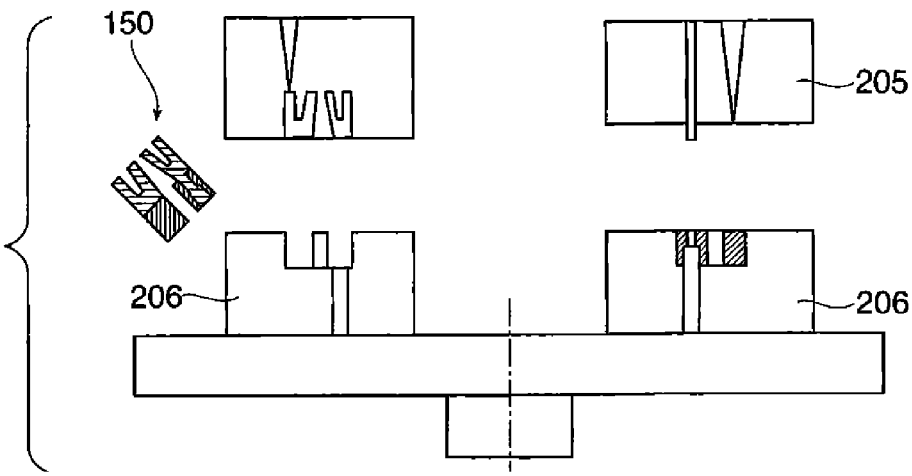
Figure 10E:
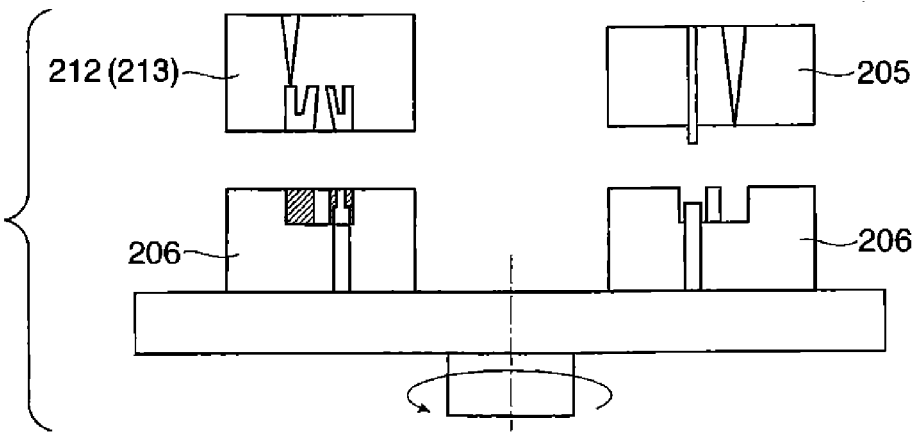

Thus, in the present exemplary embodiment, as shown in FIGS. 10A and 10E, a primary metal mold and a secondary metal mold are mounted on a rotary table. After the bearing member 154 is formed by the primary metal mold, the bearing member 154 is left in the primary metal mold, and the rotary table is rotated to form the seal member in the primary mold so that the seal member 155 is formed integrally with the baring member 154. Further, at that time, in the secondary mold, the bearing member 154 is formed.

In the case of the rotary two-color type manufacturing device, since the bearing member 154 does not need to be temporarily taken out from the metal mold after the bearing member 154 is previously formed, it is suitable to automate the manufacturing device of the bearing seal unit 150, the quality may be stabilized ands a cost may be lowered. The coaxial accuracy of the bearing member and the seal member may be achieved more highly precisely than the above-described manufacturing method.

Figure 11:
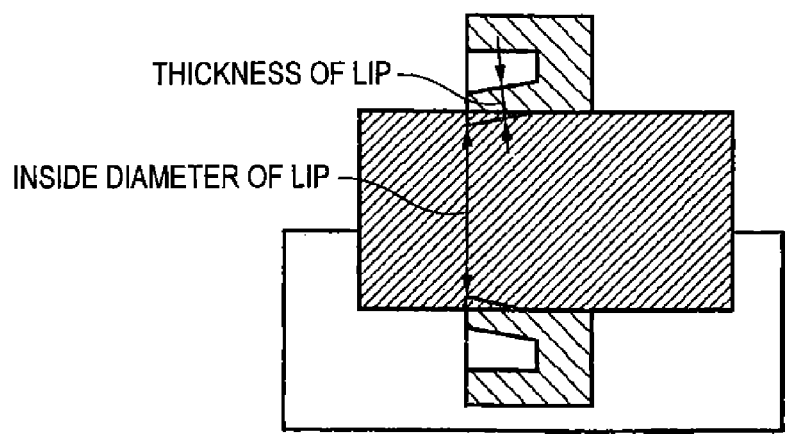
FIG. 11 is a schematic view showing the inside diameter and thickness of a lip part of the seal member.
Figure 12:
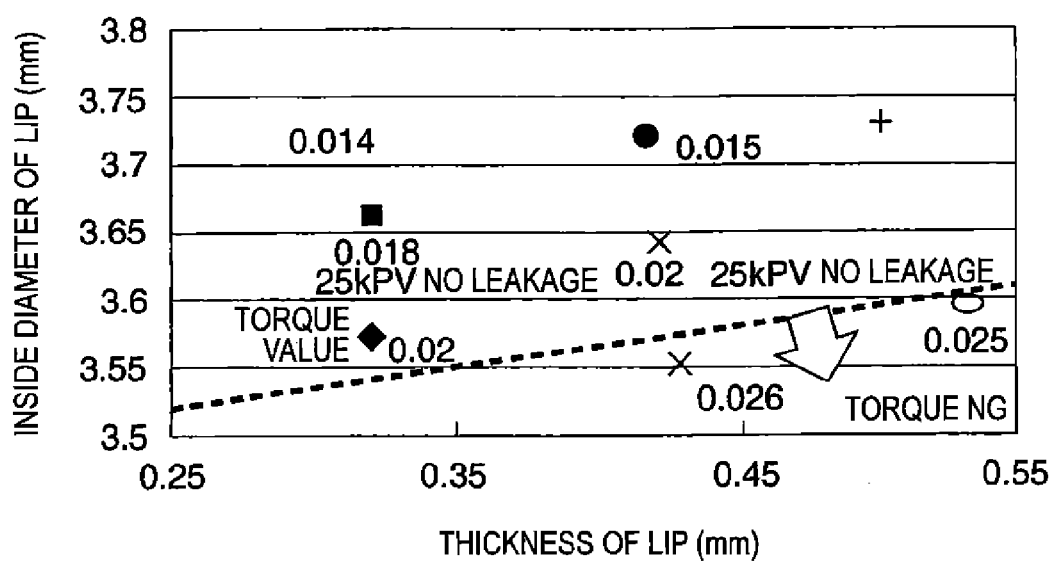
FIG. 12 is a graph showing a relation between the inside diameter and the thickness of the lip part of the seal member and the torque of a rotating shaft.
Figure 13:
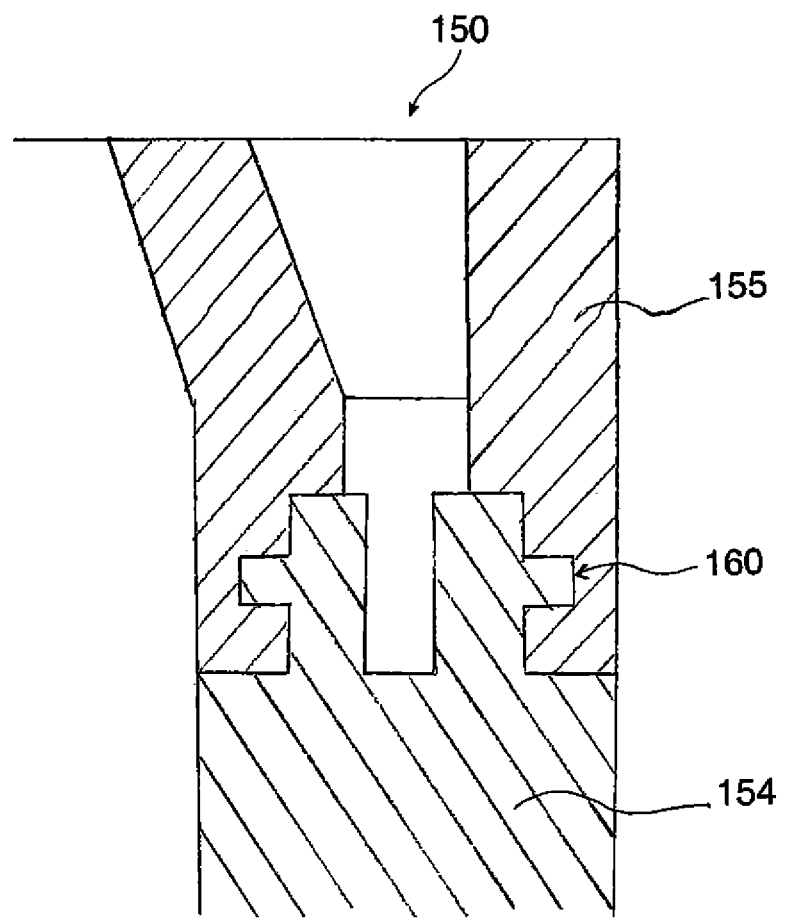
FIG. 13 is a sectional structure view showing a modified example of the bearing seal unit according to the first exemplary embodiment of the present invention.

Further, FIGS. 11 and 13 examine a relation between the inside diameter and the thickness of the lip part of the seal member and the torque of the rotating shaft. It is understood that when the inside diameter and the thickness of the lip part are prescribed to predetermined ranges, the leakage of the developer may be prevented the driving torque of the rotating shaft may be avoided from increasing.

According to the above-described structure, in the bearing seal unit according to the present exemplary embodiment, the bearing seal unit that is easy in its miniaturization and production may be provided in such a way as described below.

Namely, in the developing device and the color printer as the image forming device to which the bearing seal unit according to the present exemplary embodiment is applied, as shown in FIG. 2, in the image forming units 7Y, 7M, 7C and 7K of yellow (Y), magenta (M), cyan (C) and black (K) respectively, the toner images of the corresponding colors are sequentially formed. The toner images of the colors including yellow (Y), magenta (M), cyan (C) and black (K) sequentially formed on the photosensitive drums 8Y, 8M, 8C and 8K of the image forming units 7Y, 7M, 7C and 7K respectively are sequentially multiply transferred to the transfer sheet 37 conveyed under a state that the transfer sheet 37 is electro-statically attracted to the surface of the sheet conveying belt 31.

Then, the transfer sheet 37 to which the toner images of the colors including yellow (Y), magenta (M), cyan (C) and black (K) respectively are transferred is subjected to a fixing process by the fixing device 44 and discharged to the delivery tray 47 provided in the upper part of the printer main body 1 as shown in FIG. 2.

At that time, in the image forming units 7Y, 7M, 7C and 7K of yellow (Y), magenta (M), cyan (C) and black (K) respectively, the electrostatic latent images formed on the photosensitive drums 8Y, 8M, 8C and 8K are developed by the developing devices 11Y, 11M, 11C and 11K to form the toner images of the corresponding colors on the surfaces of the photosensitive drums 8Y, 8M, 8C and 8K.

In the developing devices 11Y, 11M, 11C and 11K, as shown in FIGS. 3 and 5, the supply paddle 116 and the first and second agitating and conveying augers 118 and 119 are rotated and driven in the developing device main body 111 so that the developer 110 accommodated in the developing device main body 111 is agitate, conveyed and supplied to the developing roll 113 to develop the electrostatic latent images formed on the surfaces of the photosensitive drums 8Y, 8M, 8C and 8K.

With the miniaturization of the printer main body 1 and the developing devices 11Y, 11M, 11C and 11K, the above-described developing device main body 111 is formed to be compact. Thus, the rotating shafts 123, 127 and 128 of the supply paddle 116 and the first and second agitating and conveying augers 118 and 119 need to be supported by the compact bearing members 154 so as to freely rotate and the leakage of the toner from the bearing members 154 needs to be assuredly prevented.

In the present exemplary embodiment, as shown in FIG. 1, the bearing seal unit 150 is used in which the bearing member 154 is formed integrally with the seal member 155 and the bearing member 154 is miniaturized and the leakage of the toner from the bearing member 154 may be assuredly prevented at the same time.

Further described, the bearing seal unit 150 is, as shown in FIG. 1, mechanically (structurally) connected by the connecting part 160 extended from the seal member 155 side to the bearing member 154. The bearing member 154 and the seal member 155 may be firmly formed integrally with good accuracy and may be easily manufactured by an injection molding process the metal molds.

Accordingly, when the bearing seal unit 150 according to the present exemplary embodiment is employed in the developing devices 11Y, 11M, 11C and 11K, such circumstances do not occur as to unnecessarily enlarge the outside diameter of the bearing member 154 in order to form the bearing member 154 integrally with the seal member 155, which causes the developing device 11 to be enlarged or to make the structure of the bearing seal unit 150 complicated, which causes a cost to increase, and the bearing seal unit 150 may be manufactured more inexpensively than a case that the compact bearing member 154 and the seal member 155 are separately manufactured.

A form of the connecting part 160 is not limited to the form shown in FIG. 1. As shown in FIG. 13, a connecting part may be provided in a part extended from the bearing member 154 side to the seal member 155 side.

Further, in the bearing seal unit 150 according to the present exemplary embodiment, since the bearing member 154 is formed integrally with the seal member 155, when the bearing seal unit 150 is attached to the developing device main body 111 of the developing device 11, the seal member 155 may be guided and inserted by the bearing member 154. Thus, the seal member 155 may be avoided from being attached in an inclined state. As a result, sealing characteristics by the seal member 155 may be improved.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments are chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. A bearing seal unit comprising:
    a bearing member that supports a rotating shaft so as to freely rotate;
    a seal member provided integrally at one side along an axial direction of the bearing member to seal the rotating shaft;
    a connecting part extended along the axial direction from one member to the other member of the bearing member and the seal member and having an end side in the extending direction which protrudes more in the direction intersecting the axial direction than a base end side to connect the bearing member integrally with the seal member, wherein
    the connecting part includes a cylindrical part extended in a cylindrical form along the axial direction from the seal member to the bearing member and a large diameter part provided in a top end side of the cylindrical part which has an outside diameter set to be larger than a base end side of the cylindrical part.

2. The bearing seal unit according to claim 1, wherein the seal member includes, in an inner peripheral side in the radial direction thereof, a lip part that is provided in a cylindrical form along the axial direction of the rotting shaft and comes into contact with an outer peripheral surface of the rotating shaft to seal the rotating shaft, the lip part has an inside diameter of its end part set be smaller than an outside diameter of the rotating shaft and an inside diameter of its base end part set to be larger than the outside diameter of the rotating shaft and the lip part is arranged to be inclined in a tapered form.

3. The bearing seal unit according to claim 1, wherein the seal member is inserted and used into an attaching hole provided in a support member that supports the rotating shaft so as to freely rotate through the bearing member and an outside diameter of the seal member is set to be larger than an inside diameter of the attaching hole as the support member.

4. The bearing seal unit according to claim 1, wherein the connecting part is provided at three or more positions along the circumferential direction of the rotating shaft.

5. A developing device comprising:
    an agitating and conveying member that is rotated and driven so as to agitate and convey a developer accommodated in an inner part;
    a developer carrier that carries the developer agitated and conveyed by the agitating and conveying member;
    a bearing member that is attached to an attaching hole provided in a developing device main body to support a rotating shaft of the agitating and conveying member so as to freely rotate;
    a seal member provided integrally at one side along an axial direction of the bearing member and inserted into the attaching hole provided in the developing device main body that supports the rotating shaft so as to freely rotate through the bearing member and used to seal the rotating shaft; and a connecting part extended along the axial direction from one member to the other member of the bearing member and the seal member and having an end side in the extending direction which protrudes more in the direction intersecting the axial direction than a base end side to connect the bearing member integrally with the seal member, wherein the connecting part includes a cylindrical part extended in a cylindrical form along the axial direction from the seal member to the bearing member and a large diameter part provided in a top end side of the cylindrical part which has an outside diameter set to be larger than a base end side of the cylindrical part.

6. An image forming device comprising:

an image carrier on which an electrostatic latent image corresponding to image information is formed;

a developer carrier that carries a developer for developing the electrostatic latent image formed on the image carrier;

an agitating and conveying member rotated and driven so as to agitate and convey the developer supplied to the developer carrier;

a bearing member attached to an attaching hole provided in a developing device main body to support a rotating shaft of the agitating and conveying member so as to freely rotate;

a seal member provided integrally at one side along an axial direction of the bearing member and inserted into the attaching hole provided in the developing device main body that supports the rotating shaft so as to freely rotate through the bearing member and used to seal the rotating shaft; and a connecting part extended along the axial direction from one member to the other member of the bearing member and the seal member and having an end side in the extending direction which protrudes more in the direction intersecting the axial direction than a base end side to connect the bearing member integrally with the seal member, wherein the connecting part includes a cylindrical part extended in a cylindrical form along the axial direction from the seal member to the bearing member and a large diameter part provided in a top end side of the cylindrical part which has an outside diameter set to be larger than a base end side of the cylindrical part.

* * * * *